(12) United States Patent
Sargis

(10) Patent No.: US 7,006,626 B2
(45) Date of Patent: Feb. 28, 2006

(54) SUBSCRIBER INTERFACE CIRCUIT

(75) Inventor: Raman Sargis, San Jose, CA (US)

(73) Assignee: Texas Instruments Incorporated, Dallas, TX (US)

(*) Notice: Subject to any disclaimer, the term of this patent is extended or adjusted under 35 U.S.C. 154(b) by 246 days.

(21) Appl. No.: 10/427,770

(22) Filed: Apr. 30, 2003

(65) Prior Publication Data

US 2004/0091098 A1 May 13, 2004

Related U.S. Application Data

(60) Provisional application No. 60/424,437, filed on Nov. 7, 2002.

(51) Int. Cl.
*H04M 11/06* (2006.01)
(52) U.S. Cl. .............. 379/413.03; 379/93.01
(58) Field of Classification Search .......... 379/413.03, 379/399.01, 394, 93.01
See application file for complete search history.

(56) References Cited

U.S. PATENT DOCUMENTS

| | | | |
|---|---|---|---|
| 6,002,684 A | 12/1999 | McVerry | 370/359 |
| 6,285,672 B1 | 9/2001 | McVerry et al. | 370/359 |
| 6,483,904 B1 | 11/2002 | Yucebay | 379/93.02 |
| 2002/0098863 A1 * | 7/2002 | Ferianz | 455/552 |

* cited by examiner

*Primary Examiner*—Daniel Swerdlow
(74) *Attorney, Agent, or Firm*—Abdul Zindani; W. James Brady, III; Frederick J. Telecky, Jr.

(57) ABSTRACT

A subscriber line interface circuit is provided that posses an output impedance that may be greater than about 2.2 Kohms at at least some frequencies associated ADSL communications. In at least some embodiments, such ADSL frequencies include frequencies greater than about 30 KHz. In some embodiments, the subscriber line interface circuit includes an output driver that provides voice signals on a telephone line on which digital data is also provided by a data driver and a filter coupled to the output driver wherein the output impedance of the subscriber line interface circuit is greater than about 2.2 Kohms at at least some frequencies greater than 30 KHz.

7 Claims, 3 Drawing Sheets

SUBSCRIBER INTERFACE CIRCUIT

CROSS-REFERENCE TO RELATED APPLICATION(S)

This application claims priority to Provisional Application Ser. No. 60/424,437 entitled "ADSL Friendly POTS SLIC," filed Nov. 7, 2002 and incorporated herein by reference.

BACKGROUND

1. Field of the Invention

The present invention generally relates to communication systems. More particularly, the invention generally relates to asynchronous digital subscriber line ("ADSL") technology and more particularly still to a subscriber line interface circuit and plain old telephone system ("POTS") splitter used with an ADSL line driver.

2. Background Information

With the advent of digital subscriber line ("DSL") and asynchronous digital subscriber line ("ADSL") technology, voice and data may be transmitted on the same wire (i.e., the telephone line). As such, voice circuitry and ADSL circuitry may couple to a common telephone line. The frequency range of voice signals generally differs from that of the digital data thereby permitting both voice and data to coexist on the telephone line. It is desirable for the voice circuitry not to place an excessive load on the ADSL circuitry. If excessive loading is present, the ADSL signals may be excessively attenuated. Accordingly, improvements related to avoiding excessive loading in an ADSL system are desirable.

BRIEF SUMMARY

In accordance with various embodiments described herein, a subscriber line interface circuit is provided that is characterized by an output impedance that may be greater than about 2.2 Kohms at at least some frequencies associated ADSL communications. In at least some embodiments, such ADSL frequencies include frequencies greater than about 30 KHz and less than about 1100 KHz. In some embodiments, the subscriber line interface circuit includes an output driver that provides voice signals on a telephone line on which digital data is also provided by a data driver and a filter coupled to the output driver wherein the output impedance of the subscriber line interface circuit is greater than about 2.2 Kohms at at least some frequencies greater than 30 KHz.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, different companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect connection. Thus, if a first device couples to a second device, that connection may be through a direct connection, or through an indirect connection via other devices and connections. "Broadband" transmissions are generally those transmissions at frequencies greater than voice band signals (e.g. frequencies greater than about 4 khz). To the extent that any term is not specially defined in this specification, the intent is that the term is to be given its plain and ordinary meaning.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
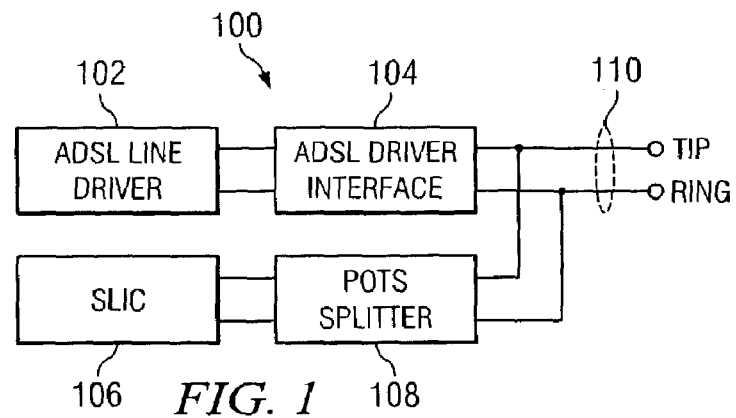
FIG. 1 illustrates a system in which voice and data may be communicated over a common telephone line in accordance with a preferred embodiment of the invention.

Referring now to FIG. 1, a communication system 100 is shown in accordance with a preferred embodiment of the invention. As shown, the system 100 includes an asynchronous digital subscriber line ("ADSL") driver 102, an ADSL driver interface 104, a subscriber line interface circuit ("SLIC") 106 and a plain old telephone system ("POTS") splitter 108 coupled together and to a telephone line 110. The telephone line 110 may comprise "tip" and "ring" signals as is commonly known. In general, voice and/or data may be transmitted between a subscriber and a remote location (e.g., a central office). The system 100 shown in FIG. 1 may be indicative of at least some of the components included in the remote location. Other components may be included as desired and the components show in FIG. 1 may be included at a subscriber's location.

The ADSL line driver 102 may transmit data through the ADSL driver interface 104 on to the telephone line 110 and receive data from the telephone line. The ADSL driver interface 104 generally isolates the ADSL line driver 102 from the telephone line 110 and may include capacitors and/or other electrical components to prevent the line driver 102 from excessively loading the SLIC 106. The SLIC 106 generally comprises the analog front end for the POTS for voice signals.

Figure 2:
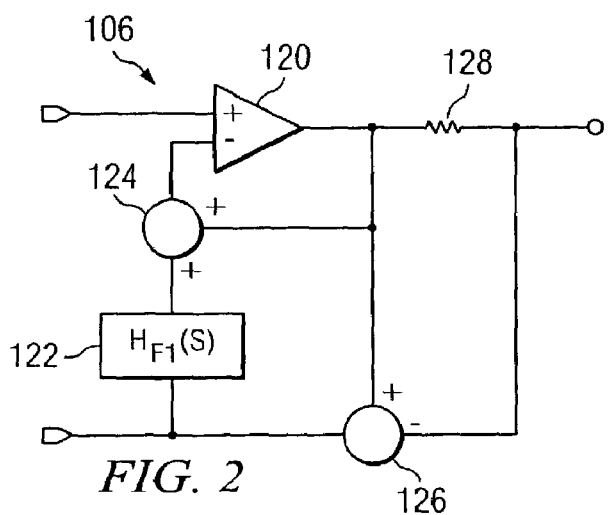
FIG. 2 shows a preferred embodiment of a subscriber line interface circuit included in the system of FIG. 1.
Figure 3:
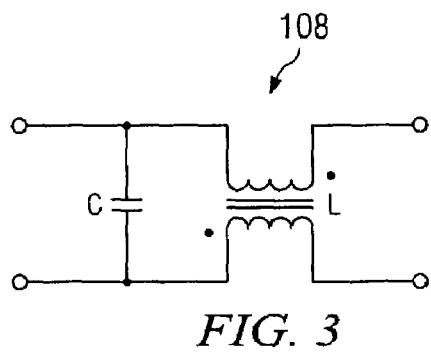
FIG. 3 shows a preferred embodiment of a splitter used in the system of FIG. 1.

In accordance with the preferred embodiments of the invention, the SLIC 106 and POTS splitter 108 function together to help ameliorate the loading affects on the ADSL line driver 102 that may be caused by the SLIC 106 in the frequency band of the ADSL signals. FIGS. 2 and 3 show preferred embodiments of the SLIC 106 and POTS splitter 108, respectively. Referring to FIG. 2, at least a part of the SLIC 106 is shown as including an operational amplifier 120, a filter 122, two adders 124 and 126, and a resistor 128. The circuit shown in FIG. 2 may be representative of the output stage of the SLIC. Additional detail regarding SLICs may be found in a variety of sources such as U.S. Pat. Nos. 6,483,904; 6,285,672; and 6,002,684, all of which are incorporated herein by reference. The POTS splitter 108 in FIG. 3 may comprise an inductor L coupled to a shunt capacitor C.

The filter 122 shown in FIG. 122 preferably comprises a high pass filter or a bandpass filter. Without limitation, a transfer function that may be suitable for the filter to function as a high pass filter is as follows:

$$H(s) = \frac{1*10^4 s^2}{2*10^2 s^2 + 1.42*10^8 s + 5.05*10^{11}}$$

The following is a transfer function that may be suitable for the filter to function as a bandpass filter:

$$H(s) = \frac{18*10^8 * s^2}{2*10^2 * s^2 + 1*10^8 * s + 1.5*10^{13}}$$

With filter 122, the output impedance of the SLIC 106 may be frequency dependent in such a way as to not cause excessive loading on the ADSL line driver 102. In some embodiments, the output impedance of the SLIC 106 may be an impedance that is suitable for voice band signals. For example, the impedance may be about 900 ohms in the frequency range below about 4 KHz. Above about 4 KHz, the output impedance of the SLIC 106 may increase to a level that is high enough that the ADSL line driver 102 may not be excessively loaded in the frequency range of its typical operation (about 30 KHz to about 1100 KHz).

Figure 4:
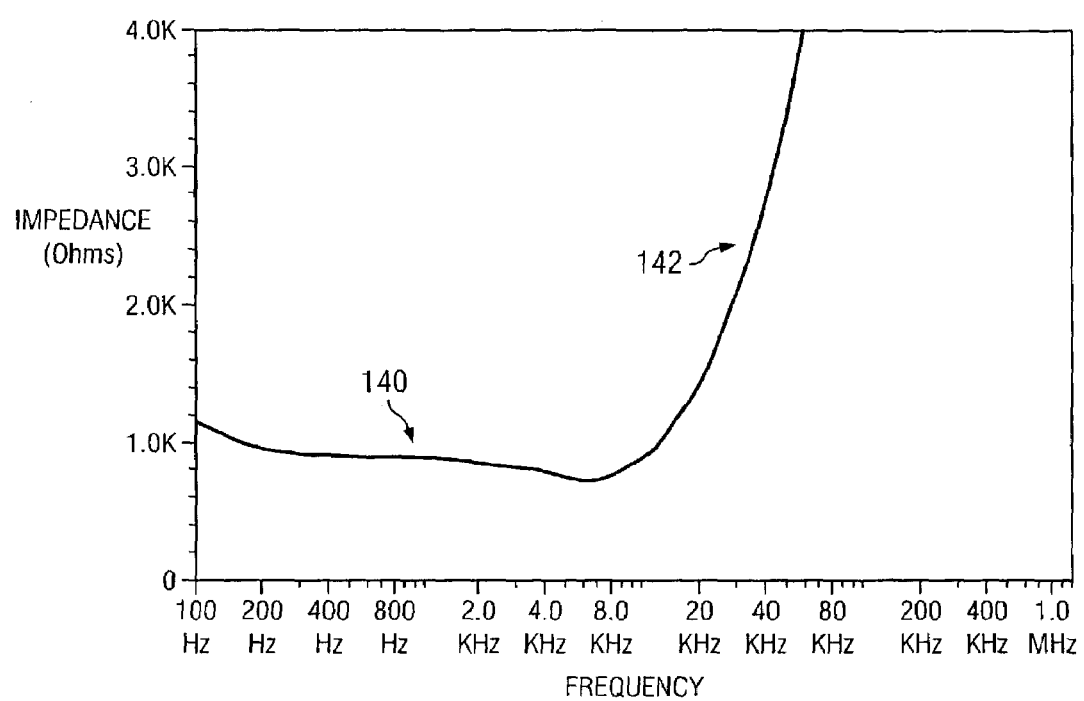
FIG. 4 shows an exemplary output impedance plot of the subscriber line interface circuit of FIG. 2.
Figure 5:
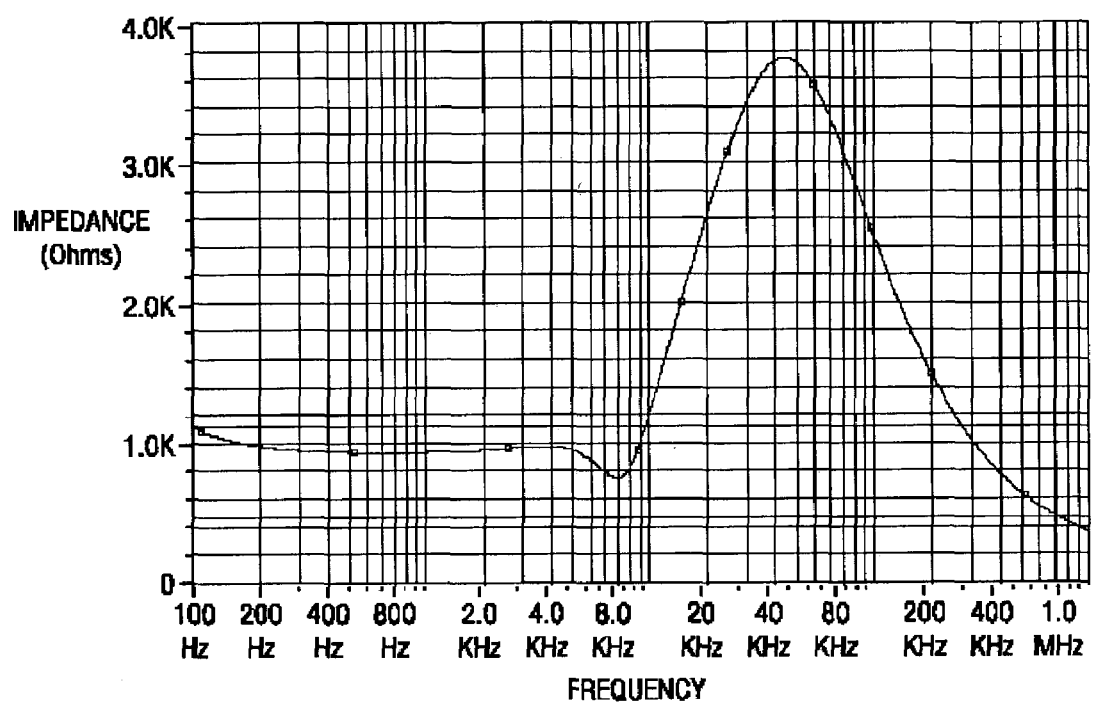
FIG. 5 shows another exemplary output impedance plot of the subscriber line interface circuit of FIG. 2.

FIG. 4 shows a plot of the output impedance of the SLIC 106 with respect to frequency in accordance with the high pass transfer function. As can be seen, in region 140, the output impedance if relatively flat at about 900 ohms. Region 140 includes frequencies from about 100 Hz to about 4 KHz. In region 142 (frequencies above about 4 KHz), the SLIC output impedance rises sharply. At about 30 KHz, the output impedance is about 2.2 Kohms. With an output impedance of about 2.2 Kohms, ADSL line driver 102 may not be excessively loaded by the combination of the SLIC 106 and POTS splitter 108. FIG. 5 shows another exemplary output impedance pot in accordance with the bandpass transfer function.

In an alternative embodiment and as noted above, the filter 122 may be implemented as a bandpass filter. As such, the output impedance of the SLIC 106 may be in excess of a threshold value (e.g., 2.2 KHz) over a range of frequencies (e.g., about 30 KHz to about 140 KHz), and fall off at higher frequencies.

With the output impedance of the SLIC 106 in excess of about 2.2 Kohms for at least some of the frequencies usable for implementing ADSL data communications (e.g., frequencies between about 30 KHz and about 1100 KHz), the POTS splitter 108 may be implemented with an inductor having an inductance valve that is generally less than for inductors used in conventional POTS splitters. As such, at least one of the passive electrical components in the preferred POTS splitter 108 advantageously may be physically smaller than in conventional splitters. In accordance with the preferred embodiment, POTS splitter 108 may be improved with an inductor having an inductance of about 2 mH. Without limitation, the inductor L in FIG. 3 may be manufactured in a package having the following dimensions: 8 mm×8.5 mm×6.8 mm. Shunt Capacitor C in FIG. 3 may have a capacitance value of less than about 1.8 nF. Capacitor C may be manufactured as an NPO ceramic capacitor in a well-known 1210 package style and size. As such, capacitor C may be provided on the backside of a circuit board. It is believed that using an inductor and capacitor as described above may save about 7 square inches with respect to at least some conventional 24 channel line cards (SLICs).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A subscriber line interface circuit, comprising:
an output driver that provides voice signals on a telephone line on which broadband data is also provided by a data driver;
a filter coupled to said output driver;
wherein the output impedance of the subscriber line interface circuit is greater than about 2.2 Kohms at at least some frequencies greater than 30 KHz, and wherein the filter implements at least one of the following transfer functions:

$$H(s) = \frac{1*10^4 s^2}{2*10^2 s^2 + 1.42*10^8 s + 5.05*10^{11}}$$

and $$H(s) = \frac{18*10^8 * s^2}{2*10^2 * s^2 + 1*10^8 * s + 1.5*10^{13}}.$$

2. The subscriber line interface circuit of claim 1 wherein said filter comprises a high pass filter.

3. The subscriber line interface circuit of claim 1 wherein said filter comprises a bandpass filter.

4. The subscriber line interface circuit of claim 1 wherein the data driver comprises an asynchronous digital subscriber line driver coupled to said telephone line.

5. A communication system coupled to a telephone line, comprising:
an asynchronous digital subscriber line driver coupled to the telephone line that provides digital data signals on the telephone line;
a splitter coupled to said telephone line; and
a subscriber line interface circuit coupled to the splitter, said subscriber line interface circuit comprising an output driver that provides voice signals on the telephone line and a filter coupled to said output driver, wherein the output impedance of the subscriber line interface circuit is greater than about 2.2 Kohms at at least some frequencies greater than 30 KHz
and wherein the filter implements at least one of the following transfer functions:

$$H(s) = \frac{1*10^4 s^2}{2*10^2 s^2 + 1.42*10^8 s + 5.05*10^{11}}$$

and $$H(s) = \frac{18*10^8 * s^2}{2*10^2 * s^2 + 1*10^8 * s + 1.5*10^{13}}.$$

6. The communication system of claim 5 wherein said filter comprises high pass filter.

7. The communication system of claim 5 wherein said filter comprises bandpass filter.

* * * * *